Aug. 3, 1965  E. A. PRICE  3,198,039
TOOL FOR SEALING AN APERTURE IN A WALL
Filed Dec. 21, 1961
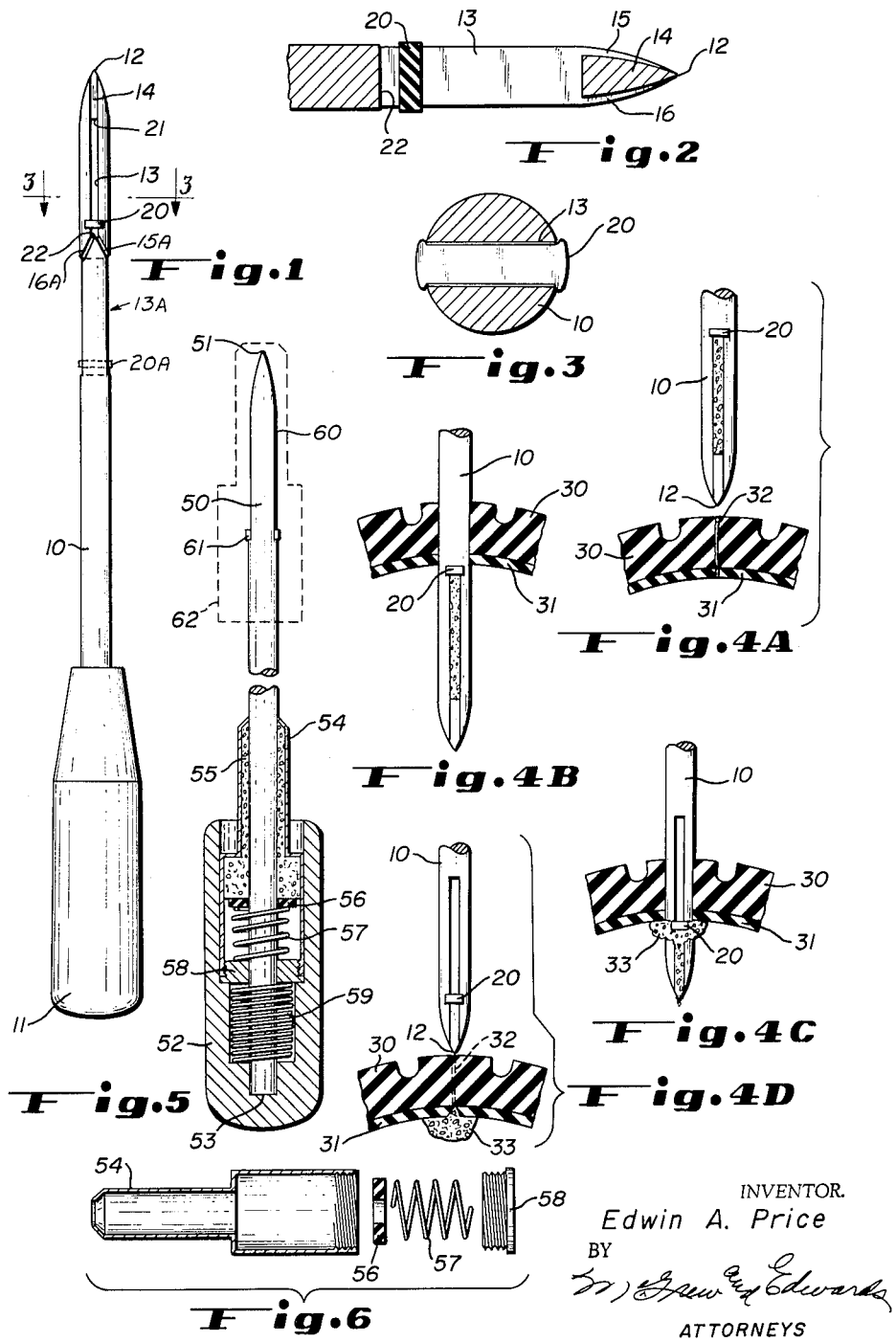
INVENTOR.
Edwin A. Price
BY
ATTORNEYS

3,198,039
TOOL FOR SEALING AN APERTURE IN A WALL
Edwin A. Price, 1660 Trenton St., Denver, Colo.
Filed Dec. 21, 1961, Ser. No. 161,063
8 Claims. (Cl. 81—15.6)

This invention relates to repair tools and in a particular embodiment to a method of and tools for repairing and sealing cracks and punctures in inflatable devices such as pneumatic vehicle tires, plastic sporting goods, such as basketballs, and the like, air mattresses, etc.

A myriad of apparatus and tools have been tried for repairing inflatable, flexible rubber and plastic objects. The most successful such apparatus and tools for pneumatic tires, however, require dismounting of the tire in order to repair punctures in it; and for sporting goods as basketballs, air mattresses and the like, the outer surface surrounding the puncture or crack was covered with a patch.

Particularly in the case of vehicle tires on today's modern high speed automobiles, it is desirable that any patch or material which is used to repair punctures be very light in weight to prevent dynamic unbalance at high speeds. In the case of sporting goods such as a basketball, it has been difficult to repair it and maintain the desired substantially spherical character necessary for proper ball response in subsequent use.

There have been suggestions that a hypodermic needle-type apparatus might be utilized in depositing a sealant, repair material internally of a pneumatic or pressurized item being repaired. Others have suggested tools which require a relatively large aperture be formed to allow deposit of material in the form of a flexible plug. Such tools causing a large aperture require continued resealing of the plugged hole because of increased wear due to the plug, and in other of the prior devices, there is a complicated interaction between the tool parts which are easily damaged and clogged and are difficult to clean after usage.

Accordingly, it is an object of this invention to provide improved methods and tools for repair of inflatable, flexible rubber, rubber-like and plastic items.

Another object of the invention is to provide a very simple and easily operated tool for mending punctures in pneumatic items such as vehicle tires and various inflatable sporting devices, without dismantling the devices.

It is another object of the invention to provide an inflatable device repair tool which is easily cleaned and maintained in working condition.

A repair tool and the method of this invention is usable not only in the repair of inflatable, flexible items as discussed above, but in one embodiment it is also usable in repairing the walls of rigid structures such as boilers and the like.

A tool for the practice of the method of this invention includes an elongated shank of substantially uniform cross section, having a handle at one end and being pointed at the other. The shank has an elongated slot extending threthrough adjacent the pointed end. A selectively movable key is held in the slot and is arranged for free, longitudinal sliding therein. A pair of grooves extend from the slot on opposed sides of the point, shallowing out from the slot to the point of the shank. The slot itself is arranged to hold a quantity of sealing material within the confines of the shank cross section and the key is arranged to push the sealing material out of the slot.

Other objects and further features and advantages of this invention will become apparent to those skilled in the art from a study of the following detailed description with reference to the exemplary drawings, in which like reference numerals are used to designate like parts in the several views. In these drawings:

FIG. 1 is a side elevation of a novel tool for the practice of the method of this invention;

FIG. 2 is a fragmentary, sectional detail of the working end of the tool of FIG. 1;

FIG. 3 is a sectional view along the line 3—3 of the tool of FIG. 1;

FIGS. 4A, 4B, 4C and 4D are schematic views of sequential steps in the method of utilization of a tool of the type shown in FIG. 1;

FIG. 5 is a side elevation, in partial section, of an alternative arrangement of a tool for the practice of the mehod of this invention; and FIG. 6 is a telescoped view of a portion of the elements of the tool of FIG. 5.

In FIG. 1, a tool according to this invention is shown to include an elongated shank 10 of substantially uniform cross section, having a manipulating handle 11 mounted at one end and terminating in a point 12 at the other end. The shank is preferably round but may be square, hexagonal, etc. A slot 13 is formed transversely through shank 10 from adjacent the point 12 to a point intermediate its ends. The point 12 includes a tapered plug 14, which may be integral with the shank as when the slot is broached or separately mounted in the end as when the shank is milled from the point rearwardly. The plug 14 closes the shank and supports the shank for penetration into the objects to be repaired.

On opposite sides of plug 14 are grooves 15 and 16 extending from the slot to about the forward tip. A key 20 is mounted in the slot 13 and arranged for movement therein between the end 21 of plug 14 and the back wall 22 of the slot. Opposite sides of the key 20 have overhanging ears arranged to maintain the key in the slot and prevent accidental lateral displacement thereof. The key preferably does not overhang the shank to any great degree since it must also penetrate the wall of the object being repaired. Therefore, the key is arranged with only a slight extension on each side.

A second slot 13A is formed through shank 10 to the near end of, and perpendicular to, the slot 13. A key 20A, similar to key 20, is arranged for movement in slot 13A. Grooves 15A and 16A are formed in the shank to allow sealant flow between slot 13 and slot 13A under the influence of key 20A.

In use, the key 20 is moved to its rearmost position adjacent the wall 22. The desired amount of sealant is placed in the slot between the key and the point of the shank. Preferably the sealant does not extend beyond the confines of the slot. A preferred sealing material or sealant for rubber goods is a viscous, liquid butyl rubber material mixed with a conventional vulcanizer and/or accelerators, etc. The viscous nature of the sealant causes it to be self-sustaining in the slot 13 until pushed out of the slot by the keys.

The respective keys and slots operate in a similar manner, the back slot furnishing an additional reservoir for sealant. Therefore, in the following discussion of FIGS. 4A through 4D relative to operation and use of the tool, only the forward slot and key are illustrated to maintain drawing simplicity.

Referring to FIGS. 4A through 4D, the repair of a tire casing 30 having a pneumatic tube 31 in a partially inflated condition, is shown in the sequential steps of sealing a puncture 32. In FIG. 4A, the tool shank 10 is shown positioned adjacent the exterior of the puncture. In FIG. 4B, the tool is shown after penetration of the tire and tube through the puncture hole; the penetration of the tool must be sufficient to place the key 20 interiorly of inner surface of tube 31.

In FIG. 4C, the tool is shown in a partially withdrawn position. During the withdrawing operation, the key 20 engages tube wall as it extends beyond the shank and because the material squeezes down on the shank and key, it holds the key from withdrawal until it contacts the plug. During withdrawal, the key forces the sealant out of the slot by bulging it outwardly and also upwardly. The outwardly bulging sealant contacts the inner surface of the tire, if tubeless, or the tube and the sealant is pressed against the material of the wall for positive adhesion between the wall and sealant. The sealant also, flows up the grooves adjacent the point and the two streams contact above the point joining the two masses of sealant emerging from the slot. When the key reaches the plug all the sealant is exuded from the slot, and further withdrawal removes the shank and the key, pulling a slight amount of sealant into the hole, due to adherence of the sealant to the shank.

In FIG. 4D, the tool is withdrawn from the puncture 32 leaving a single contiguous body of fluid sealant 33, as shown, completely covering the internal opening of the puncture 32; including the portion indicated at 34 which has been forced into the puncture by the tube air pressure. During withdrawal of the pointed end of the tool and because of its cooperation with the grooves 15 and 16, fluid sealant is deposited as a single mass and without any opening through the body of deposited sealant, thereby providing a unitary body of sealant completely surrounding and sealing the puncture 32.

In the discussion of FIGS. 4A through 4D, a pneumatic vehicle tire having a tube was shown for purposes of explanation. My tool is equally usable with a tubeless tire, and in fact is very satisfactory in sealing such tubeless tires on the road immediately after a puncture. Such repair is, obviously, accomplished without removing the tire from the wheel. Because of the positive sealing obtained according to this invention, only very small quantities of sealant are necessary thereby maintaining substantially dynamic balance in the tire after repair. To a like extent, because of the very small quantity of sealant necessary when my tool is used, repaired basketballs, footballs and the like maintain their necessary rebound characteristics in subsequent use. Note, also, such sports equipment is repaired without disassembly or additional patching.

Preferably when inserting the tool into an item to be repaired, a twisting motion is imparted thereto in order to assure the key will bear against the inner surface of the item, and not be pulled back out of the pucture before the sealant has been deposited.

Further, although two reservoirs or slots are shown in FIG. 1, for most purposes only one is needed. Such a tool would be substantially as shown in FIGS. 4A through 4D.

A tool according to the concepts of this invention may be utilized to repair punctures in boiler walls and other rigid structures. For such repair operations, the key which is included in the tool is made of a flexible material such as rubber, rubber-like material or plastic. In penetrating the wall of a boiler, the key may be deformed but returns to its original shape after wall penetration to force the sealant out of the shank slot during withdrawal. In the case of boilers, liquid solder or other heat carrying sealant may be utilized as the repair material. Also, by using two slots, at an angle to each other, or more, spaced along the shank, layers of material may be deposited on withdrawal of the tool.

Because of the simple structure of the tool, it is very easily cleaned after use as by immersing in a solvent to thereby remove any residual sealant material. This is important in repair tools of this type since they may be used very seldom and in instances have long periods of storage between uses. Previous tools of the complicated type especially those using a small tubular passage for sealant have been difficult to clean and over long storage periods become clogged with hardened sealant.

The alternative embodiments in FIGS. 5 and 6 includes automatic sealant dispensing. The tool is comprised of elongated shank 50 having a point 51 formed at one end and a hollow handle 52 fixed at the other. Within handle 52 is a selectively spring movable sealant container 54. A charge of sealant 55 is maintained in the chamber defined by member 54 by the apertured flexible washer 56 under the action of the compressed spring 57. The spring 57 is maintained in a compressed configuration by the apertured externally threaded cap 58 which is screwed into the rear terminus of container 54. The outer surface of cap 58 is borne against by another spring 59 within handle 52.

As true of the tool of FIG. 1, a slot 60 is formed adjacent pointed end 51 of shank 50 in which a key 61 is arranged to selectively move. The pointed end 51, slot 60 and key 61 cooperate in a manner similar in all respects to the operation of the tool of FIG. 1.

To repair a tire or the like the pointed end 51 is pressed through the puncture to be sealed. During this operation the container 54 (which is normally in the dotted line position 62) is forced upwardly within the confines of the hollow handle. When shank 50 is withdrawn from a puncture being repaired, the spring 57 forces container 54 down over the slot 60 placing it within the body of sealing material 55. The action of spring 57 and washer 56 bearing against the body of material forces it within slot 60. When another repair operation is to be undertaken, the tool is utilized in exactly the same manner, during which the sealant cartridge is forced upwardly to within the confines of the handle and upon withdrawal again returns to an automatic dispensing position over slot 60 as just described.

In a preferred embodiment, the container 54 is a disposable cartridge and after the fluid contained therein has been exhausted, it is thrown away and a new one placed on the tool.

Having thus described my invention with sufficient particularity and detail to enable those skilled in the art to practice it, what I desire to have protected by Letters Patent is set forth in the following claims.

1. In a tool for sealing an aperture in a wall, an elongated shank terminating in a point at one end and having manipulating means mounted on the other end, a slot formed completely through the shank extending from adjacent said pointed end to a rear wall intermediate the ends of the shank and arranged to hold a predetermined amount of sealant, there being grooves extended from the slot to about the tip of the point and arranged to guide sealant from each slot over the tip of the point end of the shank for joining therebeyond, a movable key in the slot arranged to slide in said slot, said key having extending portions beyond said shank for contacting the wall at the aperture and be retained thereby on a withdrawal of the shank from such an aperture so as to force sealant therefrom, said movable key arrange for free sliding movement in the slot but having means to prevent lateral displacement from the slot.

2. A tool according to claim 1 in which the movable key is flexible.

3. A tool according to claim 1 in which the slot is spaced a substantial distance from said manipulating means.

4. A tool according to claim 1 in which said shank is round.

5. In a tool for sealing an aperture in a flexible wall, an elongated shank of substantially uniform cross sectional area terminating in a point at one end and a manipulating handle means at the other end, there being a slot completely formed through the shank extending from closely adjacent its pointed end to a rear wall spaced from said manipulating handle means, a tapered plug closing the forward end of the slot and extending from about the point with its rear wall adjacent thereto, said slot arranged as a chamber for viscous fluid sealant, there being opposed grooves on opposed sides of the plug extending from the slot to the point of the shank and arranged to guide a flow of sealant from the chamber on slot arranged as a chamber for viscous fluid sealant, there beyond, a movable member mounted in the slot and substantially filling the latter dimensions of said slot, said movable member arranged for free sliding movement along said slot for moving sealant therefrom but having means to prevent lateral displacement from the slot, and means on said movable member to engage a wall after complete penetration of the slot through the aperture whereby on withdrawal said member contacts said wall and remains stationary discharging sealant from the slot onto the inner surface of the flexible wall until said plug contacts said member.

6. A tool according to claim 5 in which said means to prevent lateral displacement in a pair of opposed ears extending slightly beyond said shank.

7. In a tool for sealing an aperture in a wall, an elongated shank of substantially uniform cross sectional dimensions terminating in a point at one end and having handle means at the other end, a slot formed through the shank adjacent its pointed end providing a predetermined volume of sealant therein, there being grooves extending from the slot to about the point arranged to guide fluid from the chamber over the point to join therebeyond, a movable member in the slot arranged to force fluid from the slot on relative movement of the member and shank, said movable member arranged for free sliding longitudinal movement in the slot but having means to prevent lateral displacement from the slot and having extending means for engaging said wall after complete penetration of said slot, a tubular reservoir mounted over said shank and movable from the point toward the handle so as to exposed said slot, means normally holding said reservoir adjacent the shank point, and means exerting pressure on contained fluid in said reservoir to maintain said slot filled when said reservoir is in normal position.

8. A tool according to claim 7 in which said means normally holding said reservoir is a spring biased against said handle means.

References Cited by the Examiner
UNITED STATES PATENTS

| | | | |
|---|---|---|---|
| 2,646,707 | 7/53 | Notz | 156—97 |
| 2,928,300 | 3/60 | Rodgers | 81—15.6 |

ALEXANDER WYMAN, *Primary Examiner.*

HAROLD ANSHER, *Examiner.*